United States Patent
Yang et al.

(10) Patent No.: US 9,905,025 B2
(45) Date of Patent: Feb. 27, 2018

(54) MOVING OBJECT TRACKING APPARATUS, METHOD AND UNMANNED AERIAL VEHICLE USING THE SAME

(71) Applicant: ZEROTECH (Shenzhen) Intelligence Robot Co., Ltd, Shenzhen (CN)

(72) Inventors: Jian-Jun Yang, Beijing (CN); Chong-Yang Fu, Beijing (CN); Shuang-Cheng Guo, Beijing (CN); Lin Yang, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 0 days.

(21) Appl. No.: 15/385,756

(22) Filed: Dec. 20, 2016

(65) Prior Publication Data
US 2017/0178357 A1    Jun. 22, 2017

(30) Foreign Application Priority Data
Dec. 21, 2015    (CN) .......................... 2015 1 0962504

(51) Int. Cl.
| | |
|---|---|
| G06T 7/00 | (2017.01) |
| G06T 7/73 | (2017.01) |
| B64C 39/02 | (2006.01) |
| B64D 47/08 | (2006.01) |
| G06K 9/62 | (2006.01) |

(52) U.S. Cl.
CPC .............. *G06T 7/73* (2017.01); *B64C 39/024* (2013.01); *B64D 47/08* (2013.01); *G06K 9/6211* (2013.01); *G06K 9/6215* (2013.01); *B64C 2201/123* (2013.01); *B64C 2201/127* (2013.01); *G06T 2207/10004* (2013.01); *G06T 2207/10016* (2013.01); *G06T 2207/10032* (2013.01)

(58) Field of Classification Search
None
See application file for complete search history.

(56) References Cited

PUBLICATIONS

Fernando, W. S. P., Lanka Udawatta, and Pubudu Pathirana. "Identification of moving obstacles with Pyramidal Lucas Kanade optical flow and k means clustering." Information and Automation for Sustainability, 2007. ICIAFS 2007. Third International Conference on. IEEE, 2007.*

Ohmer, Julius Fabian, and Nicholas J. Redding. "GPU-accelerated KLT tracking with monte-carlo-based feature reselection." Computing: Techniques and Applications, 2008. DICTA'08. Digital Image. IEEE, 2008.*

Tissainayagam, Prithiraj, and David Suter. "Assessing the performance of corner detectors for point feature tracking applications." Image and Vision computing 22.8 (2004): 663-679.*

(Continued)

*Primary Examiner* — Vu Le
*Assistant Examiner* — Tracy Mangialaschi (57) ABSTRACT

A moving object tracking apparatus is disclosed. The moving object tracking apparatus includes an image input module, a memory, a coordinate obtainment module, a tracking coordinate filtering module, a displacement vector obtainment module, a similarity integral obtainment module, and a tracking point output module. A moving object tracking method is also provided.

17 Claims, 8 Drawing Sheets

(56) References Cited

PUBLICATIONS

Dessauer, Michael P., and Sumeet Dua. "Optical flow object detection, motion estimation, and tracking on moving vehicles using wavelet decompositions." SPIE Defense, Security, and Sensing. International Society for Optics and Photonics, 2010.*

Han, Bing, et al. "Robust feature-based object tracking." Proc. of SPIE vol. vol. 6568. 2007.*

Claus, Christopher, et al. "Optimizing the SUSAN corner detection algorithm for a high speed FPGA implementation." Field Programmable Logic and Applications, 2009. FPL 2009. International Conference on. IEEE, 2009.*

\* cited by examiner

MOVING OBJECT TRACKING APPARATUS, METHOD AND UNMANNED AERIAL VEHICLE USING THE SAME

CROSS-REFERENCE TO RELATED APPLICATIONS

This application claims all benefits accruing under 35 U.S.C. § 119 from China Patent Application No. 201510962504.6, filed on Dec. 21, 2015 in the State Intellectual Property Office of China, the content of which is hereby incorporated by reference.

TECHNICAL FIELD

The present disclosure relates to image tracking technology and, particularly, to a moving object tracking apparatus, method and unmanned aerial vehicle using the same.

BACKGROUND

In an image monitoring device or system, a technique to track a moving object (e.g., a vehicle or a moving animal) is important. The image monitoring device can be used in an unmanned aerial vehicle (UAV).

In the field of image tracking technology, an optical flow method is commonly used in tracking images to moving objects. Lucas Kanade pyramid ("LKP") is an accepted optical flow method often used in a moving object tracking apparatus. The LKP method is divided into two key steps. In the first step, feature points are extracted as tracking objects. In a second step, target positions of selected feature points are obtained by an iterative process according to the selected feature points. Although the LKP method can accurately obtain the target positions, the LKP method must filter severely deviated target positions during the tracking process to avoid errors to subsequent iterative tracking processes.

The Ransac method, forward and backward tracking error method, or normalization correlation coefficient of image block can be used to filter the feature points. However, these methods require large computations. Thus, a moving object tracking system using the above methods has a relatively low arithmetic speed, and accordingly, the unmanned aerial vehicle using the above moving object tracking system has a low tracking efficiency.

BRIEF DESCRIPTION OF THE DRAWINGS

Implementations are described by way of example only with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 1:
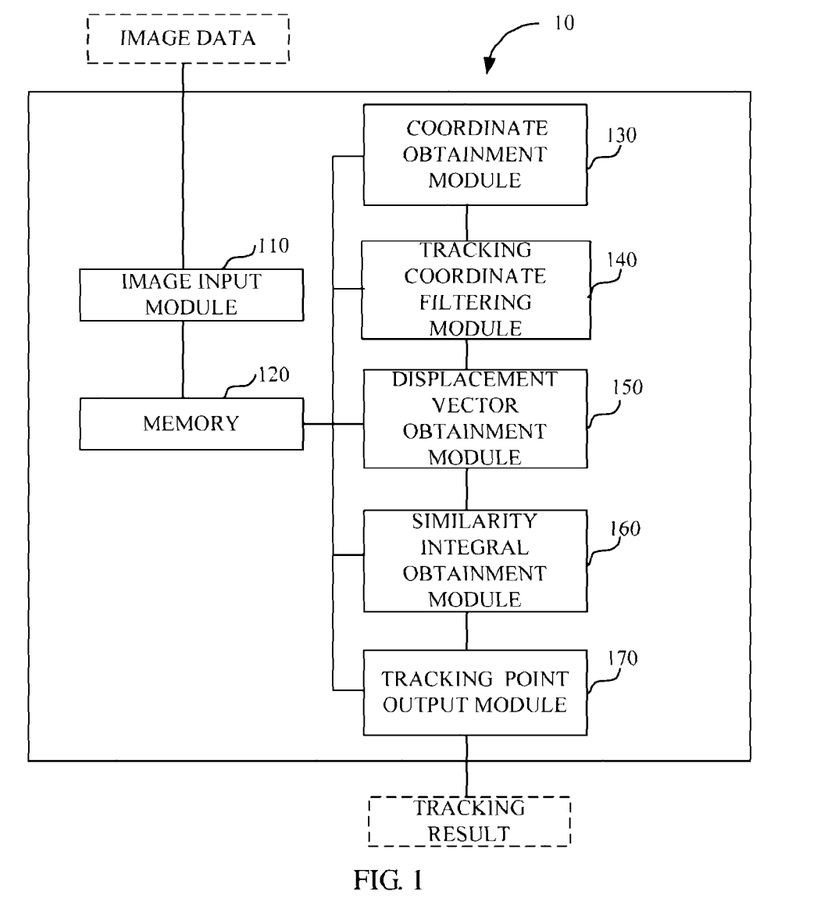
FIG. 1 is a block diagram of one embodiment of a moving object tracking apparatus.

Referring to FIG. 1, one embodiment of a moving object tracking apparatus 10 is disclosed. The moving object tracking apparatus 10 includes an image input module 110, a memory 120, a coordinate obtainment module 130, a tracking coordinate filtering module 140, a displacement vector obtainment module 150, a similarity integral obtainment module 160, and a tracking point output module 170.

The image input module 110 is connected to the memory 120 and can receive image data from outside, and the image data includes a first image and a second image. The first image and the second image can be two adjacent frames taken from the image data of a moving object. The images can be obtained by a camera or output from a computer.

The memory 120 is configured to store the first and second images, and information processed in the coordinate obtainment module 130, the tracking coordinate filtering module 140, the displacement vector obtainment module 150, the similarity integral obtainment module 160, or the tracking point output module 170. The memory 120 can be accessed by the image input module 110, the coordinate obtainment module 130, the tracking coordinate filtering module 140, the displacement vector obtainment module 150, the similarity integral obtainment module 160, and the tracking point output module 170.

The coordinate obtainment module 130 can receive initial coordinates of a plurality of tracking points of the moving object on the first image. The coordinate obtainment module 130 can also obtain tracking coordinates of the plurality of tracking points of the moving object on the second image according to the initial coordinates. The coordinate obtainment module 130 can send the initial coordinates and the tracking coordinates to outside, such as the tracking coordinate filtering module 140, the displacement vector obtainment module 150, or the memory 120. It is understandable that the initial coordinates and the tracking coordinates can be stored in the memory 120.

The tracking coordinate filtering module 140 filters the plurality of tracking points by a grayscale filter to obtain a plurality of filtered tracking points. It is understandable that the plurality of filtered tracking points can be stored in the memory 120.

The displacement vector obtainment module 150 estimates displacement vectors of the plurality of filtered tracking points according to the initial coordinates and the tracking coordinates of the plurality of filtered tracking points. It is understandable that the displacement vectors of the plurality of filtered tracking points can be stored in the memory 120.

The similarity integral obtainment module 160 calculates similarity integrals of the displacement vectors between each filtered tracking point and rest of the plurality of filtered tracking points. The similarity integrals and a similarity threshold can be stored in the memory 120.

The tracking point output module 170 receives the similarity integrals of the plurality of filtered tracking points. The tracking point output module 170 outputs filtered tracking points having similarity integrals greater than or equal to the similarity threshold. In other words, the tracking point output module 170 is configured to output a tracking result, in which the tracking result includes the filtered tracking points having similarity integrals greater than or equal to the similarity threshold.

Figure 2:
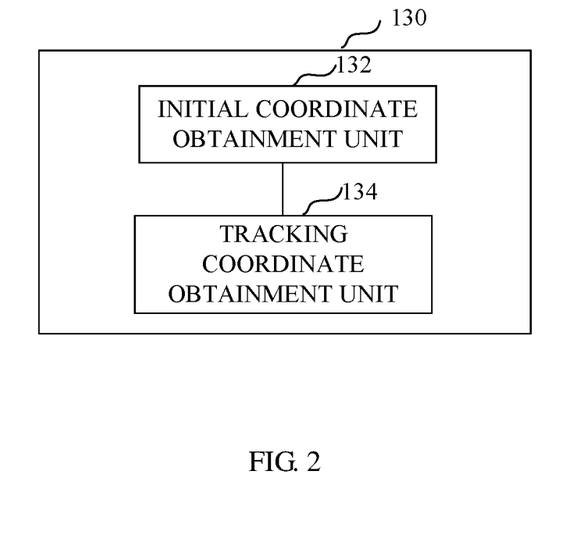
FIG. 2 is a block diagram of one embodiment of a coordinate obtainment module of the moving object tracking apparatus.

Referring to FIG. 2, in one embodiment, the coordinate obtainment module 130 includes an initial coordinate obtainment unit 132 and a tracking coordinate obtainment unit 134. The initial coordinate obtainment unit 132 can obtain the initial coordinates of the plurality of tracking points of the moving object on the first image stored in the memory 120. The tracking coordinate obtainment unit 134 can estimate the tracking coordinates of the plurality of tracking points of the moving object on the second image stored in the memory 120.

Figure 3:
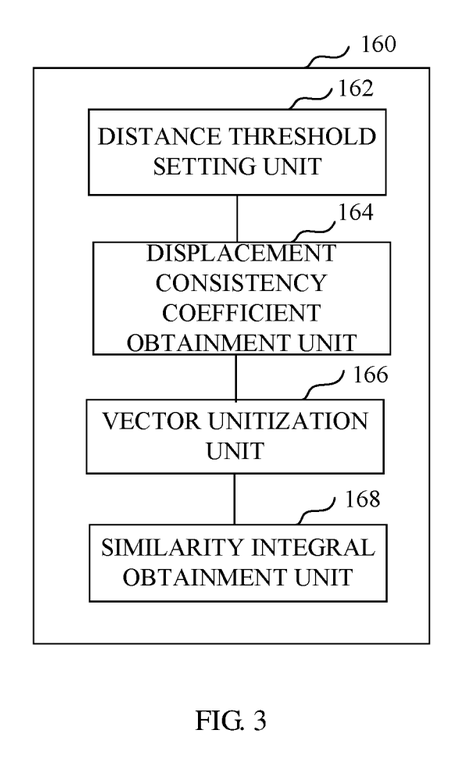
FIG. 3 is a block diagram of one embodiment of a similarity integral obtainment module of the moving object tracking apparatus.

Referring to FIG. 3, the similarity integral obtainment module 160 includes a distance threshold setting unit 162, a displacement consistency coefficient obtainment unit 164, a vector unitization unit 166, and a similarity integral obtainment unit 168. The distance threshold setting unit 162 sets a distance threshold. The displacement consistency coefficient obtainment unit 164 estimates displacement consistency coefficients of the displacement vectors between each filtered tracking point and rest of the plurality of filtered tracking points. The vector unitization unit 166 unitizes displacement vectors of the plurality of filtered tracking points to obtain unit vectors of the plurality of filtered tracking points. The similarity integral obtainment unit 168 calculates the similarity integrals according to the displacement consistency coefficients and the unit vectors of the plurality of filtered tracking points. It is understandable that the displacement vectors, the distance threshold, the displacement consistency coefficients and the similarity integrals can be stored in the memory 120.

Figure 4:
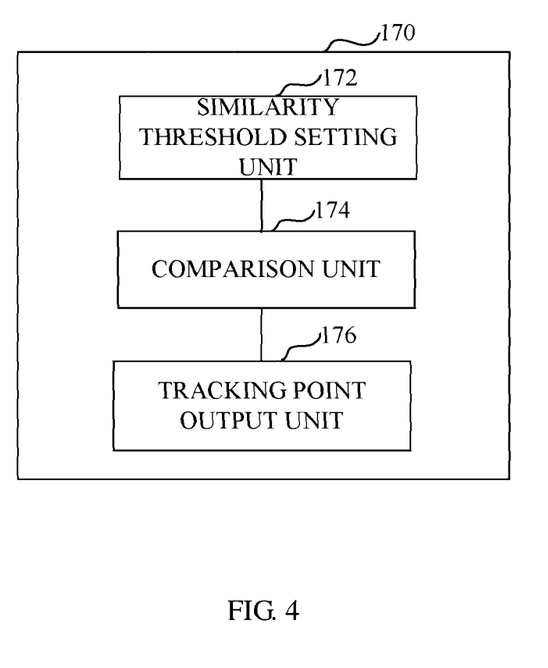
FIG. 4 is a block diagram of one embodiment of a tracking point output module of the moving object tracking apparatus.

Referring to FIG. 4, in one embodiment, the tracking point output module 170 includes a similarity threshold setting unit 172, a comparison unit 174 and a tracking point output unit 176. The similarity threshold setting unit 172 sets a similarity threshold. The comparison unit 174 compares the similarity threshold with the similarity integral of each filtered tracking point. The tracking point output unit 176 outputs filtered tracking points having similarity integrals greater than or equal to the similarity threshold.

Figure 5:
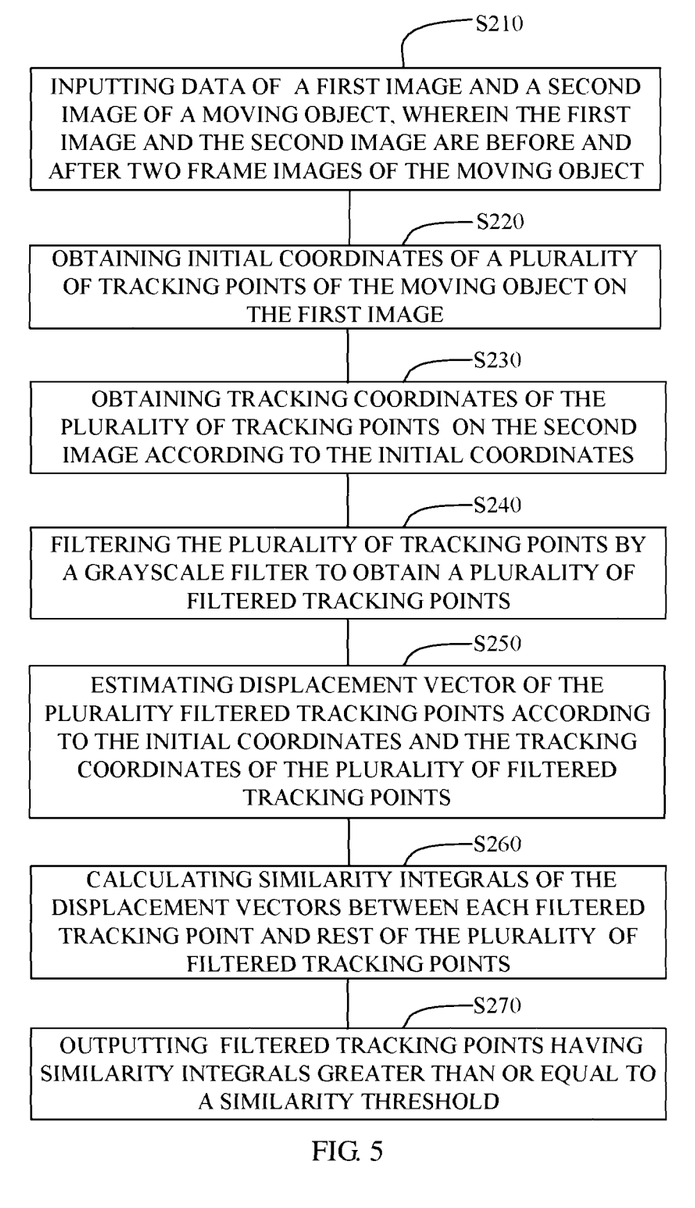
FIG. 5 is a flow chart of one embodiment of a moving object tracking method.

Referring to FIG. 5, a moving object tracking method is provided in one embodiment. The moving object tracking method can be performed by the moving object tracking apparatus 10. The method comprises:

S210, inputting data of a first image and a second image of a moving object, wherein the first image and the second image are before and after two frame images;

S220, obtaining initial coordinates of a plurality of tracking points of the moving object on the first image;

S230, obtaining tracking coordinates of the plurality of tracking points on the second image according to the initial coordinates;

S240, filtering the plurality of tracking points by a grayscale filter to obtain a plurality of filtered tracking points;

S250, estimating displacement vectors of the plurality of filtered tracking points according to the initial coordinates and the tracking coordinates of the plurality of filtered tracking points;

S260, calculating similarity integrals of the displacement vectors between each filtered tracking point and rest of the plurality of filtered tracking points; and S270, outputting filtered tracking points having similarity integrals greater than or equal to a similarity threshold.

In S210, the first image can be an image of the moving object taken at a preceding time, and the second image can be an image of the moving object taken at a subsequent time. In one embodiment, the first image and the second image are two adjacent frames obtained by shooting of the moving object. The moving object can be a moving animal or person, vehicle and so on. In one embodiment, a serial of images of the moving object can be captured by a camera in an image tracking system as the data. The moving object is remained within the shooting scope of the camera. The camera can be installed on a photographic reconnaissance satellite, or an unmanned aerial vehicle. Two adjacent frames can be selected as the first image and the second image. It is understandable that the moving object is a tracking object tracked by the camera. In one embodiment, the first image and the second image are input by the image input module 110 (e.g., the camera or the computer) to the memory 120 and stored in the memory 120.

In S220, the plurality of tracking points of the moving object on the first image is selected via Kanade-Lucas-Tomasi feature tracker. The initial coordinates of the plurality of tracking points of the moving object on the first image are denoted by $[x_i, y_i]$ wherein $1 \leq i \leq n$. The initial coordinates of the plurality of tracking points of the moving object on the first image can be obtained by the coordinate obtainment module 130 and stored in the memory 120. In one embodiment, one point on upper left corner of the first image is selected as origin of coordinate to estimate the initial coordinates of the plurality of tracking points. It is understandable that the origin of coordinate can be selected in other ways and not limited in above way.

In S230, an origin of coordinate of the second image can be the same as the origin of coordinate of the first image, such as one point on upper left corner of the second image. The tracking coordinates of the plurality of tracking points on the second image are estimated according to the initials coordinates using a LKP iteration process. The tracking coordinates of the plurality of tracking points are denoted by $[a_i, b_i]$, wherein $1 \leq i \leq n$. The tracking coordinates of the plurality of tracking points can be stored in the memory 120.

In S240, the plurality of tracking points are filtered by the grayscale filter to obtain the plurality of filtered tracking points. In one embodiment, S240 further includes:

S242, obtaining a first gray difference vector of each of the plurality of tracking points on the first image;

S244, obtaining a second gray difference vector of each of the plurality of tracking points on the second image;

S246, calculating a normalized correlation coefficient between the first and the second gray difference vectors of each of the plurality of tracking points; and S248, outputting tracking points with normalized correlation coefficients greater than or equal to a threshold value to obtain the plurality of filtered tracking points.

In S242, a first sampling window around each tracking point on the first image is extracted. Gray value matrix of pixel points in the first sampling window is obtained. The gray value matrix is expanded into a one-dimensional vector P. An average $\overline{P}$ of the one-dimensional vector P is calculated. The first gray difference vector nP=P−$\overline{P}$ of each tracking point on the first image is obtained. It is understandable that the first gray difference vector can be stored in the memory 120.

In S244, a second sampling window around each tracking point on the second image is extracted. The second sampling window has same shape and size as the first sampling window. Gray value matrix of pixel points in the second sampling window is obtained. The gray value matrix is expanded into a one-dimensional vector Q. An average $\overline{Q}$ of the one-dimensional vector Q is calculated. The second gray difference vector nQ=Q−$\overline{Q}$ of each tracking point on the first image is obtained. It is understandable that the second gray difference vector can be stored in the memory 120.

In step S246, the normalized correlation coefficient is calculated via $$\text{corr} = \left| \left( \frac{nP}{\|nP\|} \cdot \frac{nQ}{\|nQ\|} \right) \right|$$

and stored in the memory 120.

In S248, the tracking points with normalized correlation coefficients greater than or equal to the threshold value are considered as valid results and stored in the memory 120 as the plurality of filtered tracking points. The tracking points with normalized correlation coefficients smaller than the threshold value are considered as invalid results and removed. The threshold value has a range from about 0 to about 1. The threshold value can be determined according to a need of precision. The higher the precision requirement is, the higher the threshold value is, and the more tracking points are removed.

In S250, the displacement vectors of the plurality of filtered tracking points is denoted by $\vec{u}_i$, wherein 1≤i≤n. The initial coordinates of the plurality of tracking points of the moving object on the first image are denoted by [$x_i,y_i$], wherein 1≤i≤n. The tracking coordinates of the plurality of tracking points are denoted by [$a_i,b_i$], wherein 1≤i≤n. The displacement vectors of the plurality of filtered tracking points are calculated by $\vec{u}_i$=[$a_i,b_i$]−[$x_i,y_i$]=[$q_i,w_i$], wherein 1≤i≤n. It is understandable that the displacement vectors of the plurality of filtered tracking points can be stored in the memory 120.

In S260, the similarity integrals can be stored in the memory 120. In one embodiment, S260 includes:

S262, calculating displacement consistency coefficients of the displacement vectors between each filtered tracking point and rest of the plurality of filtered tracking points;

S264, unitizing the displacement vectors of the plurality of filtered tracking points to obtain unit vectors of the plurality of filtered tracking points; and S266, calculating the similarity integrals according to the displacement consistency coefficients and the unit vectors of the plurality of filtered tracking points.

In S262, the displacement consistency coefficient is denoted by $d_{ij}$, wherein 1≤i, j≤n. $\Delta U=|u_i|-|u_j|$, wherein $\Delta U$ is a modulus difference, $|u_i|$ is a modulus of the displacement vector of any filtered tracking point respectively, and $|u_j|$ is a modulus of the displacement vectors of rest of the filtered tracking points. When an absolute value $|\|\vec{u}_i\|-\|\vec{u}_j\||$ of the modulus difference is less than a distance threshold, the displacement consistency coefficient $d_{ij}$ is 1. When the absolute value $|\|\vec{u}_i\|-\|\vec{u}_j\||$ of the modulus difference is greater than or equal to the distance threshold, the displacement consistency coefficient $d_{ij}$ is 0. The distance threshold can be in a range from about 0 to about 5. The distance threshold is related to time interval and image tracking accuracy of the images. The shorter the time interval is, the higher the image tracking accuracy is, and the distance threshold value is smaller. In one embodiment, the distance threshold is 1. It is understandable that the distance threshold and the displacement consistency coefficient $d_{ij}$ can be stored in the memory 120.

In S264, the displacement vectors $\vec{u}_i$ of the plurality of filtered tracking points are unitized to obtain the unit vectors $\vec{v}_i$ of the plurality of filtered tracking points. The unit vectors $\vec{v}_i$ of the plurality of filtered tracking points can be stored in the memory 120.

In step S266, the similarity integrals are calculated via $$sum_i = \sum_{j=1}^{n} d_{ij} * (\vec{v}_i \cdot \vec{v}_j)/n,$$

wherein 1≤i, j≤n. The similarity integrals can be stored in the memory 120.

In S270, the similarity threshold can be stored in the memory 120. The similarity threshold has a range of 0~max (sum). The max(sum) is the greatest value of the similarity integrals. In one embodiment, the similarity threshold can be 0.9*max(sum). The filtered tracking points having similarity integrals greater than or equal to the similarity threshold are valid and output. The filtered tracking points having similarity integrals less than the similarity threshold are removed.

Figure 6:
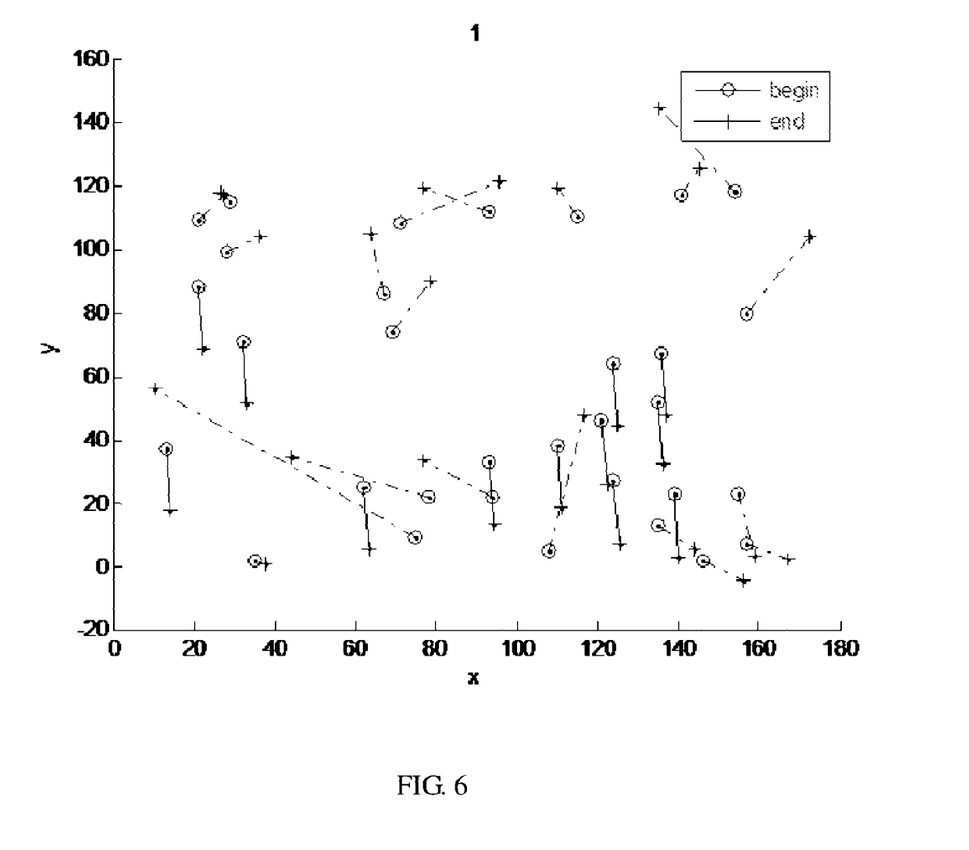
FIG. 6 is a schematic diagram of tracking result of the moving object tracking method in FIG. 5.

Referring to FIG. 6, in one embodiment, when the distance threshold is 1 and the similarity threshold is 0.9*max (sum), the result of the moving object tracking method is shown. In FIG. 6, solid lines indicate the displacement vectors of the filtered tracking points with valid results. Broken lines indicate the displacement vectors of the filtered tracking points with invalid results. Beginning point of the displacement vector is represented by 'o' in FIG. 6. End point of the displacement vector is represented by '+'. In the moving object tracking method provided in this disclosure, the filtered tracking points are selected by calculating the similarity integrals of the displacement vectors between each filtered tracking point and rest of the plurality of filtered tracking points. The tracking precision requirement is satisfied, and the arithmetic speed is increased. The moving object tracking method and apparatus described above can be applied to an intelligent terminal including tracking a UAV, a photographic reconnaissance satellite, an automatic ranging machine, an automatic positioning machine and so on.

Figure 7:
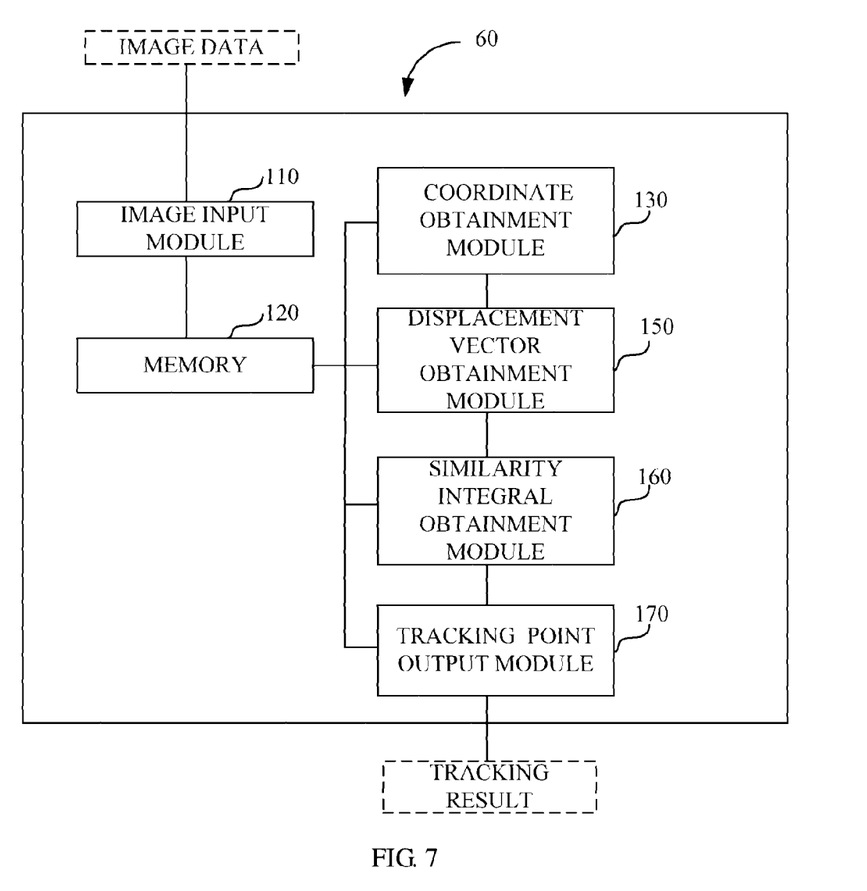
FIG. 7 is a block diagram of another embodiment of the moving object tracking apparatus.

Referring to FIG. 7, another embodiment of a moving object tracking apparatus 60 is disclosed. The moving object tracking apparatus 60 includes an image input module 110, a memory 120, a coordinate obtainment module 130, a displacement vector obtainment module 150, a similarity integral obtainment module 160, and a tracking point output module 170. Compared to the moving object tracking apparatus 10 in FIG. 1, the moving object tracking apparatus 60 does not include the tracking coordinate filtering module 140. In the moving object tracking apparatus 60, the plurality of tracking points are not filtered by the tracking coordinate filtering module 140. The displacement vector obtainment module 150, the similarity integral obtainment module 160, and the tracking point output module 170 process the plurality of tracking points stored in the memory 120.

In FIG. 7, the displacement vector obtainment module 150 estimates displacement vectors of the plurality of tracking points according to the initial coordinates and the tracking coordinates of the plurality of tracking points. It is understandable that the displacement vectors of the plurality of tracking points can be stored in the memory 120.

In FIG. 7, the similarity integral obtainment module 160 calculates similarity integrals of the displacement vectors between each tracking point and rest of the plurality of tracking points. The similarity integrals and a similarity threshold can be stored in the memory 120.

In FIG. 7, the tracking point output module 170 receives the similarity integral according to each of the plurality of tracking points. The tracking point output module 170 outputs tracking points having similarity integrals greater than or equal to the similarity threshold.

Figure 8:
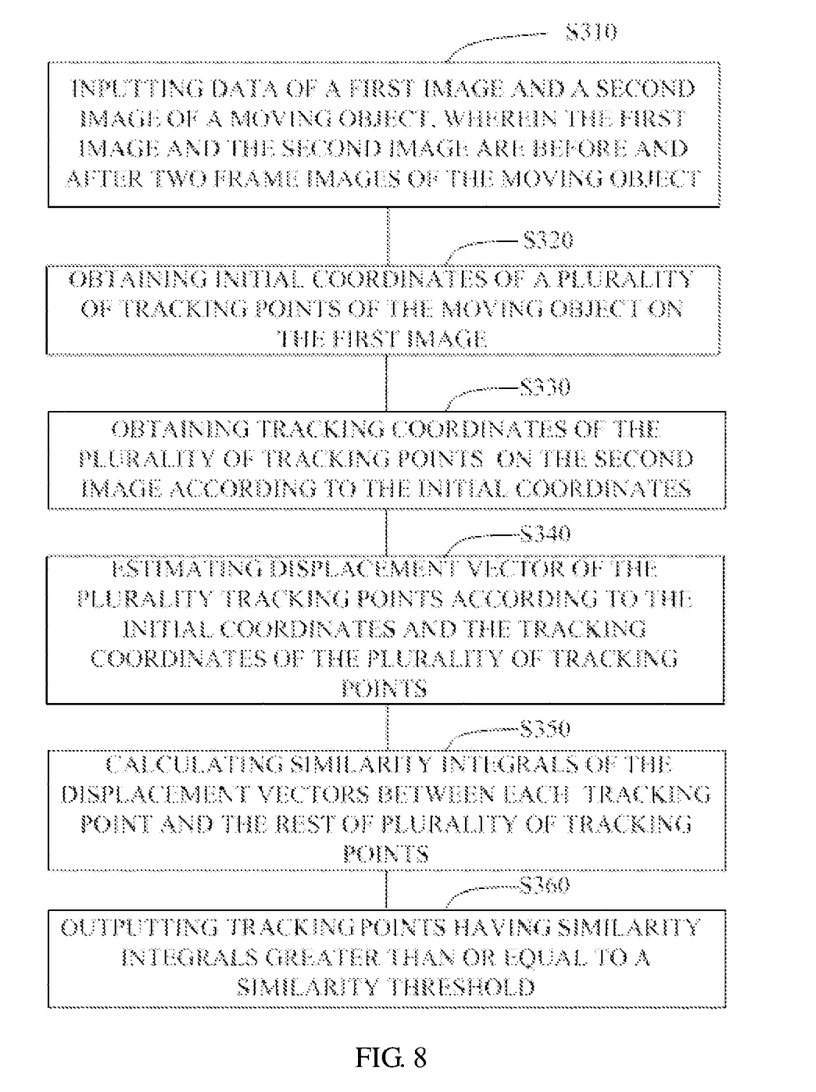
FIG. 8 is a flow chart of another embodiment of the moving object tracking method.

Referring to FIG. 8, a moving object tracking method is provided in one embodiment. The moving object tracking method can be performed by the moving object tracking apparatus 60. The method includes:

S310, inputting data of a first image and a second image of a moving object, wherein the first image and the second image are before and after two frame images;

S320, obtaining initial coordinates of a plurality of tracking points of the moving object on the first image;

S330, obtaining tracking coordinates of the plurality of tracking points on the second image according to the initial coordinates;

S340, estimating displacement vectors of the plurality of tracking points according to the initial coordinates and the tracking coordinates of the plurality of tracking points;

S350, calculating similarity integrals of the displacement vectors between each tracking point and rest of the plurality of tracking points; and S360, outputting tracking points having similarity integrals greater than or equal to a similarity threshold.

In S310, the first image can be an image of the moving object taken at a preceding time, and the second image can be an image of the moving object taken at a subsequent time. In one embodiment, the first image and the second image are two adjacent frames obtained by shooting of the moving object. The moving object can be a moving animal or person, vehicle and so on. In one embodiment, a serial of images of the moving object can be captured by a camera in an image tracking system as the data. The moving object remains within the shooting scope of the camera. The camera can be installed on photographic reconnaissance satellite, or unmanned aerial vehicle. Two adjacent frame images are selected as the first image and the second image. It is understandable that the moving object is tracking object tracked by the camera. In one embodiment, the first image and the second image are obtained from the image data input outside and stored in the memory 120.

In S320, the plurality of tracking points of the moving object on the first image is selected via Kanade-Lucas-Tomasi feature tracker. The initial coordinates of the plurality of tracking points of the moving object on the first image are denoted by $[x_i,y_i]$, wherein $1\leq i\leq n$. The initial coordinates of the plurality of tracking points of the moving object on the first image can be obtained by the coordinate obtainment module 130 and stored in the memory 120. In one embodiment, one point on upper left corner of the first image is selected as origin of coordinate to estimate the initial coordinates of the plurality of tracking points. It is understandable that the origin of coordinate can be selected in other ways and not limited to above way.

In S330, an origin of coordinate of the second image can be the same as the origin of coordinate of the first image, such as one point on upper left corner of the second image. The tracking coordinates of the plurality of tracking points on the second image are estimated according to the initials coordinates using a LKP iteration process. The tracking coordinates of the plurality of tracking points are denoted by $[a_i,b_i]$, wherein $1\leq i\leq n$. The tracking coordinates of the plurality of tracking points can be stored in the memory 120.

In S340, the displacement vectors of the plurality of tracking points is denoted by $\vec{u}_i$, wherein $1\leq i\leq n$. The initial coordinates of the plurality of tracking points of the moving object on the first image are denoted by $[x_i,y_i]$, wherein $1\leq i\leq n$. The tracking coordinates of the plurality of tracking points are denoted by $[a_i,b_i]$, wherein $1\leq i\leq n$. The displacement vectors $\vec{u}_i$ of the plurality of tracking points are calculated by $\vec{u}_i=[a_i,b_i]-[x_i,y_i]=[q_i,w_i]$, wherein $1\leq i\leq n$. It is understandable that the displacement vectors of the plurality of tracking points are stored in the memory 120.

In S350, the similarity integrals can be stored in the memory 120. In one embodiment, S350 includes:

S352, calculating displacement consistency coefficients of the displacement vectors between each tracking point and rest of the plurality of tracking points;

S354, unitizing the displacement vectors of the plurality of tracking points to obtain unit vectors of the plurality of tracking points; and S356, calculating the similarity integrals according to the displacement consistency coefficients and the unit vectors of the plurality of tracking points.

In S352, the displacement consistency coefficient is denoted by $d_{ij}$, wherein $1\leq i, j\leq n$. A modulus difference can be obtained by modulus of the displacement vector of any tracking point respectively minus modulus of the displacement vectors of rest of the tracking points. When an absolute value $|\|\vec{u}_i\|-\|\vec{u}_j\||$ of the modulus difference is less than a distance threshold, the displacement consistency coefficient $d_{ij}$ is 1. When the absolute value $|\|\vec{u}_i\|-\|\vec{u}_j\||$ of the modulus difference is greater than or equal to the distance threshold, the displacement consistency coefficient $d_{ij}$ is 0. The distance threshold can be in a range from about 0 to about 5. The distance threshold is related to time interval and image tracking accuracy of the images. The shorter the time interval, the higher the image tracking accuracy, and the smaller the distance threshold value. In one embodiment, the distance threshold is 1. It is understandable that the distance threshold and the displacement consistency coefficient $d_{ij}$ can be stored in the memory 120.

In S354, the displacement vectors $\vec{u}_i$ of the plurality of tracking points are unitized to obtain the unit vectors $\vec{v}_i$ of the plurality of tracking points. The unit vectors $\vec{v}_i$ of the plurality of tracking points are stored in the memory 120.

In step S356, the similarity integrals are calculated via $$sum_i = \sum_{j=1}^{n} d_{ij} * (\vec{v}_i \cdot \vec{v}_j)/n,$$

wherein 1≤i, j≤n. The similarity integrals can be stored in the memory 120.

In S360, the similarity threshold can be stored in the memory 120. The similarity threshold has a range of 0~max (sum). The max(sum) is the greatest value of the similarity integrals. In one embodiment, the similarity threshold can be 0.9*max(sum). The tracking points having similarity integrals greater than or equal to the similarity threshold are valid and output. The tracking points having similarity integrals less than the similarity threshold are removed.

One embodiment of an image tracking system is also disclosed. The image tracking system comprises a camera, a controlling device, and the above described moving object tracking apparatus 10 or 60. The moving object tracking apparatus 10 or 60 outputs the filtered tracking points having similarity integrals greater than or equal to the similarity threshold. The controlling device controls the camera to rotate based on the tracking points or the filtered tracking points to track the moving object thereby keeping the moving object in the shooting scope of the camera.

Another embodiment of an unmanned aerial vehicle is also disclosed. The unmanned aerial vehicle includes a camera, a flying controlling device, and the above described moving object tracking apparatus 10 or 60. The flying controlling device controls the flight of the unmanned aerial vehicle and the camera. Therefore, the moving object tracking apparatus 10 or 60 or method can be applied to an unmanned aerial vehicle. The tracking result can be obtained more quickly and accurately via the moving object tracking apparatus 10 or 60 or method, so that the UAV can accurately track the moving object. For embodiments of the present disclosure, the processing of the present disclosure can be accomplished by a computer executable program, and this program can be realized in a computer-readable memory device.

In embodiments of the present disclosure, the memory device, such as a magnetic disk, a optical disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present disclosure, the computer executes each processing stage of the embodiments according to the program stored in the memory device. The computer may be one apparatus such as a personal computer or a system in which a plurality of processing apparatuses are connected through the network. Furthermore, in the present disclosure, the computer is not limited to the personal computer. Those skilled in the art will appreciate that a computer includes a processing unit in an information processor, a microcomputer, and so on. In short, the equipment and the apparatus that can execute the functions in embodiments of the present disclosure using the program are generally called the computer.

Other embodiments of the disclosure will be apparent to those skilled in the art from consideration of the specification and practice of the disclosure disclosed herein. It is intended that the specification and examples be considered as exemplary only, with the true scope and spirit of the disclosure being indicated by the following claims.

What is claimed is:

1. A moving object tracking apparatus, comprising:
a processor and a memory configured to store a first image and a second image of a moving object, wherein the first image and the second image are two adjacent frame images in time of the moving object, the memory having instructions stored thereon, which when executed by the processor, cause the processor to:
receive initial coordinates of a plurality of tracking points of the moving object on the first image stored in the memory, and to obtain tracking coordinates of the plurality of tracking points of the moving object on the second image stored in the memory according to the initial coordinates; and
estimate displacement vectors of a plurality of filtered tracking points according to the initial coordinates and the tracking coordinates of the plurality of tracking points;
calculate similarity integrals of the displacement vectors between each tracking point and rest of the plurality of tracking points, wherein the similarity integrals are calculated via $$sum_i = \sum_{j=1}^{n} d_{ij} * (\vec{v_i} \cdot \vec{v_j})/n,$$

1≤i, j≤n, $\vec{v_i}$ and $\vec{v_j}$ are unit vectors of the plurality of filtered tracking points, and $d_{ij}$ are displacement consistency coefficients; and
output tracking points having similarity integrals greater than or equal to a similarity threshold to track the moving object.

2. The moving object tracking apparatus of claim 1, wherein the instructions, when executed by the processor, further cause the processor to input the first image and the second image of the moving object.

3. The moving object tracking apparatus of claim 1, wherein the instructions, when executed by the processor, further cause the processor to:
set a distance threshold;
unitize the displacement vectors of the plurality of tracking points to obtain unit vectors of the plurality of tracking points;
estimate displacement consistency coefficients of the displacement vectors between each tracking point and rest of the plurality of tracking points; and
calculate the similarity integrals according to the displacement consistency coefficients and the unit vectors of the plurality of tracking points.

4. The moving object tracking apparatus of claim 3, wherein the instructions, when executed by the processor, further cause the processor to:
set a similarity threshold; and
compare the similarity threshold with the similarity integral of each tracking point, before the output of the tracking points having similarity integrals greater than or equal to the similarity threshold.

5. The moving object tracking apparatus of claim 1, wherein the instructions, when executed by the processor, further cause the processor to:
filter the plurality of tracking points by a grayscale filter to obtain the plurality of filtered tracking points;
estimate displacement vectors of the plurality of filtered tracking points according to the initial coordinates and the tracking coordinates of the plurality of filtered tracking points;
calculate similarity integrals of the displacement vectors between each filtered tracking point and rest of the plurality of filtered tracking points; and
output filtered tracking points having similarity integrals greater than or equal to the similarity threshold.

6. A computer implemented moving object tracking method, the method performed by a processor configured to execute the method, the method comprising:
inputting data of a first image and a second image of a moving object in a memory, wherein the first image and the second image are two adjacent frame images in time of the moving object;
obtaining initial coordinates of a plurality of tracking points of the moving object on the first image stored in the memory;
obtaining tracking coordinates of the plurality of tracking points on the second image stored in the memory according to the initial coordinates;
estimating displacement vectors of a plurality of filtered tracking points according to the initial coordinates and the tracking coordinates of the plurality of tracking points;
calculating similarity integrals of the displacement vectors between each filtered tracking point and rest of the plurality of tracking points, wherein the similarity integrals are calculated via $$sum_i = \sum_{j=1}^{n} d_{ij} * (\vec{v_i} \cdot \vec{v_j})/n,$$

$1 \le i, j \le n$, $\vec{v_i}$ and $\underline{v}_j$ are unit vectors of the plurality of filtered tracking points, and $d_{ij}$ are displacement consistency coefficients; and
outputting tracking points having similarity integrals greater than or equal to a similarity threshold to track the moving object.

7. The computer implemented moving object tracking method of claim 6, wherein the plurality of tracking points of the moving object on the first image is selected via Kanade-Lucas-Tomasi feature tracker.

8. The computer implemented moving object tracking method of claim 7, wherein in the same coordinate as the first image, the tracking coordinates of the plurality of tracking points on the second image are estimated according to the initials coordinates using Lucas Kanade pyramid iteration process.

9. The computer implemented moving object tracking method of claim 6, wherein the calculating similarity integrals of the displacement vectors between each filtered tracking point and rest of the plurality of tracking points further comprises:
calculating displacement consistency coefficients of the displacement vectors between each tracking point and rest of the plurality of filtered tracking points;
unitizing the displacement vectors of the plurality of tracking points to obtain unit vectors of the plurality of tracking points; and
calculating the similarity integrals according to the displacement consistency coefficients and the unit vectors of the plurality of tracking points.

10. The computer implemented moving object tracking method of claim 6, wherein before the estimating displacement vectors of the plurality of filtered tracking points according to the initial coordinates and the tracking coordinates of the plurality of tracking points, further comprises:
filtering the plurality of tracking points by a grayscale filter to obtain a plurality of filtered tracking points.

11. The computer implemented moving object tracking method of claim 10, wherein the filtering the plurality of tracking points by a grayscale filter to obtain a plurality of filtered tracking points comprises:
obtaining a first gray difference vector of each of the plurality of tracking points on the first image stored in the memory;
obtaining a second gray difference vector of each of the plurality of tracking points on the second image stored in the memory;
calculating a normalized correlation coefficient between the first and the second gray difference vector of each of the plurality of tracking points; and
outputting tracking points with normalized correlation coefficients greater than or equal to a threshold value to obtain the plurality of filtered tracking points.

12. The moving object tracking method of claim 6, wherein the similarity threshold has a range of 0 to max (sum), wherein the max(sum) is the greatest value of the similarity integrals.

13. An unmanned aerial vehicle, comprising a camera, a flying controlling device, and a moving object tracking apparatus connected to the camera and the flying controlling device, the moving object tracking apparatus comprising:
a processor and a memory configured to store a first image and a second image of a moving object, wherein the first image and the second image are two adjacent frame images in time of the moving object, the memory having instructions stored thereon, which when executed by the processor, cause the processor to:
receive initial coordinates of a plurality of tracking points of the moving object on the first image stored in the memory, and to obtain tracking coordinates of the plurality of tracking points of the moving object on the second image stored in the memory according to the initial coordinates; and
estimate displacement vectors of a plurality of filtered tracking points according to the initial coordinates and the tracking coordinates of the plurality of tracking points;
calculate similarity integrals of the displacement vectors between each tracking point and rest of the plurality of tracking points, wherein the similarity integrals are calculated via $$sum_i = \sum_{j=1}^{n} d_{ij} * (\vec{v_i} \cdot \vec{v_j})/n,$$

$1 \leq i$, $j \leq n$, $\vec{v}_i$ and $\vec{v}_j$ are unit vectors of the plurality of filtered tracking points, and $d_{ij}$ are displacement consistency coefficients; and output tracking points having similarity integrals greater than or equal to a similarity threshold to track the moving object.

14. The unmanned aerial vehicle of claim 13, wherein the instructions, when executed by the processor, further cause the processor to input the first image and the second image of the moving object.

15. The unmanned aerial vehicle of claim 13, wherein the instructions, when executed by the processor, further cause the processor to:

set a distance threshold;

unitize the displacement vectors of the plurality of tracking points to obtain unit vectors of the plurality of tracking points;

estimate displacement consistency coefficients of the displacement vectors between each tracking point and rest of the plurality of tracking points; and calculate the similarity integrals according to the displacement consistency coefficients and the unit vectors of the plurality of tracking points.

16. The unmanned aerial vehicle of claim 15, wherein the instructions, when executed by the processor, further cause the processor to:

set a similarity threshold; and compare the similarity threshold with the similarity integral of each tracking point; before the output of the tracking points having similarity integrals greater than or equal to the similarity threshold.

17. The unmanned aerial vehicle of claim 13, wherein the instructions, when executed by the processor, further cause the processor to:

filter the plurality of tracking points by a grayscale filter to obtain the plurality of filtered tracking points;

estimate displacement vectors of the plurality of filtered tracking points according to the initial coordinates and the tracking coordinates of the plurality of filtered tracking points;

calculate similarity integrals of the displacement vectors between each filtered tracking point and rest of the plurality of filtered tracking points;

output filtered tracking points having similarity integrals greater than or equal to the similarity threshold.

* * * * *